US008323810B2

(12) United States Patent
Calundann et al.

(10) Patent No.: US 8,323,810 B2
(45) Date of Patent: Dec. 4, 2012

(54) PROTON-CONDUCTING MEMBRANE AND USE THEREOF

(75) Inventors: Gordon Calundann, North Plainfield, NJ (US); Oemer Uensal, Mainz (DE); Brian Benicewicz, Loudonville, NY (US); Eugene Scanlon, Troy, NY (US)

(73) Assignee: BASF Fuel Cell Research GmbH (DE)

( * ) Notice: Subject to any disclaimer, the term of this patent is extended or adjusted under 35 U.S.C. 154(b) by 226 days.

(21) Appl. No.: 12/907,368

(22) Filed: Oct. 19, 2010

(65) Prior Publication Data

US 2011/0033777 A1 Feb. 10, 2011

Related U.S. Application Data

(62) Division of application No. 10/566,135, filed as application No. PCT/EP2004/008229 on Jul. 23, 2004, now Pat. No. 7,820,314.

(30) Foreign Application Priority Data

Jul. 27, 2003 (EP) .................................. 03017027

(51) Int. Cl.
*H01M 8/10* (2006.01)
(52) U.S. Cl. .......... 429/33; 429/303; 429/309; 204/263; 204/296; 521/27; 528/337
(58) Field of Classification Search ................. 429/33, 429/303, 309; 521/27; 528/337; 204/263, 204/296
See application file for complete search history.

(56) References Cited

U.S. PATENT DOCUMENTS

| | | | |
|---|---|---|---|
| 3,224,908 A | 12/1965 | Duch et al. | |
| 3,293,088 A | 12/1966 | Herbst et al. | |
| 3,313,783 A | 4/1967 | Iwakura et al. | |
| 3,737,045 A | 6/1973 | Hashimoto et al. | |
| 3,783,137 A | 1/1974 | Gerber | |
| 3,808,305 A | 4/1974 | Gregor et al. | |
| 4,012,303 A | 3/1977 | D'Agostino et al. | |
| 4,075,093 A | 2/1978 | Walch et al. | |
| 4,187,333 A | 2/1980 | Rembaum et al. | |
| 4,191,618 A | 3/1980 | Coker et al. | |
| 4,212,714 A | 7/1980 | Coker et al. | |
| 4,333,805 A | 6/1982 | Davidson et al. | |
| 4,537,668 A | 8/1985 | Gaussens et al. | |
| 4,622,276 A | 11/1986 | Walsh | |
| 4,634,530 A | 1/1987 | Kuder et al. | |
| 4,775,864 A | 10/1988 | Herman | |
| 5,098,985 A | 3/1992 | Harris et al. | |
| 5,211,984 A | 5/1993 | Wilson | |
| 5,218,076 A | 6/1993 | Madison et al. | |
| 5,312,895 A | 5/1994 | Dang et al. | |
| 5,492,996 A | 2/1996 | Dang et al. | |
| 5,599,639 A | 2/1997 | Sansone et al. | |
| 5,633,337 A | 5/1997 | Tan et al. | |
| 5,643,968 A | 7/1997 | Andreola et al. | |
| 5,656,386 A | 8/1997 | Scherer et al. | |
| 5,674,969 A | 10/1997 | Sikkema et al. | |
| 6,030,718 A | 2/2000 | Fuglevand et al. | |
| 6,087,032 A | 7/2000 | Yoshitake et al. | |
| 6,096,369 A | 8/2000 | Anders et al. | |
| 6,110,616 A | 8/2000 | Sheikh-Ali et al. | |
| 6,124,060 A | 9/2000 | Akita et al. | |
| 6,197,147 B1 | 3/2001 | Bonsel et al. | |
| 6,248,469 B1 | 6/2001 | Formato et al. | |
| 6,264,857 B1 | 7/2001 | Kreuer et al. | |
| 6,368,587 B1 | 4/2002 | Anders et al. | |
| 6,607,856 B2 | 8/2003 | Suzuki et al. | |
| 6,767,585 B2 | 7/2004 | Kerres et al. | |
| 7,235,320 B2 | 6/2007 | Calundann et al. | |
| 7,288,603 B2 * | 10/2007 | Sakaguchi et al. | ............ 525/411 |
| 7,332,530 B2 | 2/2008 | Kiefer et al. | |
| 7,625,652 B2 | 12/2009 | Uensal et al. | |
| 2001/0003130 A1 | 6/2001 | Matsuoka et al. | |
| 2001/0038937 A1 | 11/2001 | Suzuki et al. | |
| 2002/0015879 A1 | 2/2002 | Gascoyne et al. | |
| 2002/0045085 A1 | 4/2002 | Formato et al. | |
| 2003/0012988 A1 | 1/2003 | Gascoyne et al. | |
| 2003/0031909 A1 | 2/2003 | Gascoyne et al. | |
| 2004/0062969 A1 | 4/2004 | Sakaguchi et al. | |
| 2004/0096734 A1 | 5/2004 | Calundann et al. | |
| 2004/0101731 A1 | 5/2004 | Jakoby et al. | |
| 2004/0127588 A1 | 7/2004 | Calumdann et al. | |
| 2004/0131909 A1 | 7/2004 | Soczka-Guth et al. | |
| 2004/0247974 A1 | 12/2004 | Uensal et al. | |
| 2005/0053820 A1 | 3/2005 | Calundann et al. | |
| 2005/0084727 A1 | 4/2005 | Kiefer et al. | |

(Continued)

FOREIGN PATENT DOCUMENTS

| | | |
|---|---|---|
| CA | 2491239 A1 | 1/2004 |
| CA | 2496589 A1 | 3/2004 |
| CA | 2498370 A1 | 4/2004 |
| DE | 1301578 B | 8/1969 |
| DE | 19653484 A1 | 6/1998 |
| DE | 10109829 A1 | 9/2002 |
| DE | 101 17 687 A1 | 10/2002 |
| DE | 10148131 A1 | 5/2003 |
| EP | 0265921 A2 | 5/1988 |
| EP | 0476560 A1 | 3/1992 |
| EP | 846733 A2 | 6/1998 |
| EP | 0893165 A2 | 1/1999 |
| EP | 1110992 A1 | 6/2001 |
| EP | 1202365 A1 | 5/2002 |
| EP | 1354907 A1 | 10/2003 |

(Continued)

OTHER PUBLICATIONS

Advisory Action from U.S. Appl. No. 10/506,387 dated Jun. 22, 2009.

(Continued)

*Primary Examiner* — Vasu Jagannathan
*Assistant Examiner* — Henry Hu
(74) *Attorney, Agent, or Firm* — Connolly Bove Lodge & Hutz LLP

(57) ABSTRACT

The present invention relates to a novel proton-conducting polymer membrane based on polyazole block polymers which, owing to their outstanding chemical and thermal properties, can be used widely and are suitable in particular as polymer electrolyte membrane (PEM) for producing membrane electrode units or so-called PEM fuel cells.

12 Claims, No Drawings

U.S. PATENT DOCUMENTS

| | | | |
|---|---|---|---|
| 2005/0118477 | A1 | 6/2005 | Kiefer et al. |
| 2005/0118478 | A1 | 6/2005 | Kiefer et al. |
| 2005/0147859 | A1 | 7/2005 | Kiefer et al. |
| 2005/0175879 | A1 | 8/2005 | Kiefer et al. |
| 2005/0256296 | A1 | 11/2005 | Kiefer et al. |
| 2006/0008690 | A1 | 1/2006 | Uensal et al. |
| 2006/0183012 | A1 | 8/2006 | Uensal et al. |
| 2006/0210881 | A1 | 9/2006 | Calundann et al. |
| 2007/0292734 | A1* | 12/2007 | Kiefer et al. .................. 429/33 |
| 2008/0026277 | A1 | 1/2008 | Peterson et al. |
| 2008/0038624 | A1 | 2/2008 | Belack et al. |
| 2010/0047669 | A1 | 2/2010 | Uensal et al. |

FOREIGN PATENT DOCUMENTS

| | | | |
|---|---|---|---|
| JP | 53-97988 | | 8/1978 |
| JP | 2002 146014 | A | 5/2002 |
| JP | 2002146016 | A | 5/2002 |
| JP | 2003022709 | A | 1/2003 |
| WO | WO-94/25506 | A1 | 11/1994 |
| WO | WO-99/10165 | A1 | 3/1999 |
| WO | WO-00/49069 | A1 | 8/2000 |
| WO | WO-0054351 | A1 | 9/2000 |
| WO | WO-01/45192 | A1 | 6/2001 |
| WO | WO-01/87992 | A2 | 11/2001 |
| WO | WO-01/94450 | A2 * | 12/2001 |
| WO | WO-01/94450 | A2 | 12/2001 |
| WO | WO-02/36249 | A1 | 5/2002 |
| WO | WO-02/36249 | A1 * | 5/2002 |
| WO | WO-02/38650 | A1 | 5/2002 |
| WO | WO-02/071518 | A1 | 9/2002 |
| WO | WO-02/081547 | A1 | 10/2002 |
| WO | WO-02/088219 | A1 | 11/2002 |
| WO | WO-02/102881 | A1 | 12/2002 |
| WO | WO-03/007411 | A2 | 1/2003 |
| WO | WO-03/022412 | A2 | 3/2003 |
| WO | WO-2004/003061 | A1 | 1/2004 |
| WO | WO-2004/024796 | A1 | 3/2004 |
| WO | WO-2004/024797 | A1 | 3/2004 |
| WO | WO-2004/031135 | A2 | 4/2004 |
| WO | WO-2005/011039 | A2 | 2/2005 |
| WO | WO-2005/011039 | A2 * | 2/2005 |

OTHER PUBLICATIONS

Advisory Action from U.S. Appl. No. 10/506,622 dated Jun. 19, 2009.
Advisory Action from U.S. Appl. No. 10/506,880 dated Jun. 22, 2009.
Gang, X. et al., "Electrolyte Additives for Phosphoric Acid Fuel Cells," The Electrochemical Society, Inc., 140(4): 896-902 (Apr. 1993).
International Search Report for International Application No. PCT/EP2004/008229 dated Jan. 17, 2005.
Interview Summary from U.S. Appl. No. 10/506,880 dated Apr. 9, 2009.
Notice of Allowance and Fees Due dated Feb. 5, 2010.
Notice of Allowance and Fees Due dated Jan. 28, 2010.
Notice of Allowance and Fees Due dated May 24, 2010.
Notification Concerning Transmittal of International Preliminary Report on Patentability, and International Preliminary Report on Patentability, International Application No. PCT/EP2004/008229, mail date Jan. 30, 2006.
Office Action from U.S Appl. No. 10/506,646, dated Nov. 12, 2008.
Office Action from U.S. Appl. No. 10/506,387 dated Jul. 2, 2007.
Office Action from U.S. Appl. No. 10/506,387 dated Sep. 11, 2008.
Office Action from U.S. Appl. No. 10/506,622 dated Jun. 28, 2007.
Office Action from U.S. Appl. No. 10/506,622 dated Sep. 11, 2008.
Office Action from U.S. Appl. No. 10/506,880 dated Jun. 29, 2007.
Office Action from U.S. Appl. No. 10/506,880 dated Sep. 11, 2008.
Office Action made Final from U.S. Appl. No. 10/506,646 dated Jun. 22, 2009.
Office Action made Final from U.S. Appl. No. 10/506,387 dated Apr. 13, 2009.
Office Action made Final from U.S. Appl. No. 10/506,387 dated May 5, 2008.
Office Action made Final from U.S. Appl. No. 10/506,622 dated Apr. 14, 2009.
Office Action made Final from U.S. Appl. No. 10/506,622 dated Feb. 14, 2008.
Office Action made Final from U.S. Appl. No. 10/506,880 dated Apr. 14, 2009.
Office Action made Final from U.S. Appl. No. 10/506,880 dated Feb. 14, 2008.
Osaheni, J.A. et al., "Synthesis of Processing of Heterocyclic Polymers as Electronic, Optoelectronic, and Nonlinear Optical Materials. 4. new Conjugated Rigid-Rod Poly(benzobis(imidazole))s", Marcomolecules 28:1172-1179 (1995) (month of publication not available).
Razaq, M., et al., "Perfluorosulfonimide as an Additives in Phosphoric Acid Fuel Cell", J. Electrochem. Soc., 136(2): 385-390 (Feb. 1989).
Sakagucki Y., et al "Preparation and Properties of Sulfonated or Phosphonated Polybenzimidazoles and Polybenzoxazoles", Polymeric Materials: Sience and Engineering, 84: 899-900 (2001) (month of publication not available).
Spry, R.J. et al., "Anisotropic Ionic Conductivity of Lithium-Doped Sulfonated PBI," J. of Polymer Sci.: Part B: Polymer Physics, 35: 2925-2933 (May 1997).
Written Opinion of the International Searching Authority, International Application No. PCT/EP2004/008229 dated Jan. 17, 2005.
Zouahri et al., "Synthesis of ion exchange membranes from ozonized high density polyethylene," European Polymer Journal, 38:2247-2254 (2002) (month of publication not available).

* cited by examiner

PROTON-CONDUCTING MEMBRANE AND USE THEREOF

This application is a divisional application of application Ser. No. 10/566,135 filed on Jan. 27, 2006 which is incorporated by reference in its entirety for all useful purposes. Application No. 10/566,135 is the U.S. National Stage of International Application No. PCT/EP2004/008229, filed Jul. 23, 2004, published in German, and claims priority under 35 U.S.C. §119 or 365 to EP Application No. 03017027.8, filed Jul. 27, 2003.

The present invention relates to a novel proton-conducting polymer membrane based on polyazole block polymers which, owing to their outstanding chemical and thermal properties, can be used widely and are suitable in particular as polymer electrolyte membrane (PEM) in so-called PEM fuel cells.

Polyazoles, for example polybenzimidazoles (®Celazole) have been known for sometime. Such polybenzimidazoles (PBIs) are prepared typically by reacting 3,3',4,4'-tetraaminobiphenyl with isophthalic acid or diphenylisophthalic acid or their esters thereof in the melt. The prepolymer formed solidifies in the reactor and is subsequently comminuted mechanically. Subsequently, the pulverulent prepolymer is finally polymerized in a solid-phase polymerization at temperatures of up to 400° C. and the desired polybenzimidazoles are obtained.

To prepare polymer films, the PBI, in a further step, is dissolved in polar, aprotic solvents, for example by dimethylacetamide (DMAc) and a film is obtained by means of classical processes.

Proton-conducting, i.e. acid-doped, polyazole membranes for use in PEM fuel cells are already known. The basic polyazole films are doped with concentrated phosphoric acid or sulfuric acid and then act as proton conductors and separators in so-called polymer electrolyte membrane fuel cells (PEM fuel cells).

As a result of the outstanding properties of the polyazole polymers, such polymer electrolyte membranes, processed to give membrane-electrode units (MEE), can be used in fuel cells at long-term operating temperatures above 100° C., in particular above 120° C. This high long-term operating temperature allows it to increase the activity of the noble metal-based catalysts present in the membrane-electrode unit (MEE). Especially in the case of use of so-called reformats made from hydrocarbons, the reformer gas comprises significant amounts of carbon monoxide which typically have to be removed by a complicated gas workup or gas purification. The possibility of increasing the operating temperature allows distinctly higher concentrations of CO impurities to be tolerated on a long-term bases.

Use of polymer electrolyte membranes based on polyazole polymers firstly allows complicated gas workup or gas purification to be partly dispensed with and secondly allows the catalyst loading in the membrane-electrode unit to be reduced. Both are unavoidable prerequisites for large-scale use of PEM fuel cells, since the costs for a PEM fuel cell system are otherwise too high.

The acid-doped polyazole-based polymer membranes known to date already exhibit a favorable property profile. However, owing to the applications desired for PEM fuel cells, especially in the automobile sector and decentralized power and heat generation (stationary sector), they are in need of improvement overall. Furthermore, the polymer membranes known to date have a high contact of dimethylacetamide (DMAc) which cannot fully be removed by means of known drying methods. The German patent application No. 10109829.4 describes a polymer membrane based on polyazoles in which the DMAc contamination has been eliminated. Although such polymer membranes exhibit improved mechanical properties, specific conductivities do not exceed 0.1 S/cm (at 140° C.).

The German patent application No. 10117687.2 describes a novel polymer membrane based on polyazoles which is obtained starting from the monomers by polymerizing in polyphosphoric acid. In PEM fuel cells, especially in high-temperature PEM fuel cells, this membrane exhibits outstanding performance. However, it has been found that these membranes are still in need of improvement with regard to their mechanical stress in order also to ensure use under extreme conditions. Especially in the automobile sector, a PEM fuel cell has to be able to be started up again without any problems even after being at rest at extremely low external temperatures. Condensed moisture can, especially at temperatures below the freezing point, result in considerable mechanical stress acting on the membrane. In addition to these requirements, a higher mechanical durability of the membrane is also advantageous in the production of the membrane-electrode. For instance, considerable forces act on the membrane in the lamination, so that good stretchability and resilience can be advantageous.

It is an object of the present invention to provide acid-containing polymer membranes based on polyazoles, which firstly have the performance advantages of the polymer membrane based on polyazoles and secondly have increased specific conductivity, especially at operating temperatures above 100° C., and additionally do not need moistening of the fuel gas.

We have now found that a proton-conducting membrane based on polyazole block polymers can be obtained when the parent monomers are suspended or dissolved in polyphosphoric acid and first polymerized up to a certain degree, and these are then mixed and polymerized to block polymers.

The doped polymer membranes exhibit very good proton conductivity with simultaneously high elongation at break.

The present invention provides a proton-conducting polymer membrane based on polyazoles, obtainable by a process comprising the steps of A) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity, or mixing one or more aromatic and/or heteroaromatic diaminocarboxylic acids having a high phosphoric acid affinity in polyphosphoric acid to form a solution and/or dispersion B) heating the mixture from step A), preferably under inert gas, and polymerizing until an intrinsic viscosity of up to 1.5 dl/g, preferably from 0.3 to 1.0 dl/g, in particular from 0.5 to 0.8 dl/g, is obtained to form a polymer whose phosphoric acid affinity is greater than the phosphoric acid affinity of the polymer formed in step D), C) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity, in polyphosphoric acid to form a solution and/or dispersion D) heating the mixture from step C), preferably under inert gas, and polymerizing until an intrinsic viscosity of up to 1.5 dl/g, preferably from 0.3 to 1.0 dl/g, in particular from 0.5 to 0.8 dl/g, is obtained to form a polymer whose phosphoric acid affinity is less than the phosphoric acid affinity of the polymer formed in step B), E) combining the polymer from step B) and the polymer from step D), the phosphoric acid affinity of the polymer from step B) being greater than the phosphoric acid affinity of the polymer from step D), F) applying a layer using the mixture according to step E) on a carrier or on an electrode, G) heating the sheetlike structure/layer obtainable according to step F), preferably under inert gas, until an intrinsic viscosity of more than 1.5 dl/g, preferably of more than 1.8 dl/g, in particular of more than 1.9 dl/g, is attained to form a polyazole block polymer, H) treating the membrane formed in step G) (until it is self-supporting).

The aromatic and heteroaromatic tetraamino compounds used in accordance with the invention and having a high phosphoric acid affinity are preferably 2,3,5,6-tetraaminopyridine, 3,3',4,4'-tetraaminodiphenylsulfone, 3,3',4,4'-tetraaminodiphenyl ether and salts thereof, especially the mono-, di-, tri- and tetrahydrochloride to derivatives thereof.

The aromatic and heteroaromatic tetraamino compounds used in accordance with the invention and having a low phosphoric acid affinity are preferably 3,3',4,4'-tetraaminobiphenyl, 1,2,4,5-tetraaminobenzene, 3,3',4,4'-tetraaminobenzophenone, 3,3',4,4'-tetraaminodiphenylmethane and 3,3',4,4'-tetraaminodiphenyldimethyl-methane and salts thereof, especially the mono-, di-, tri- and tetrahydrochloride derivatives thereof.

The aromatic carboxylic acids used in accordance with the invention are dicarboxylic acids and tricarboxylic acids and tetracarboxylic acids or the esters thereof, especially the C1-C20-alkyl esters or C5-C12-aryl esters thereof, or the anhydrides thereof or the acid chlorides thereof.

The aromatic carboxylic acids used in accordance with the invention and having a high phosphoric acid affinity are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,8-dihydroxynaphthalene-3,6-dicarboxylic acid and diphenylsulfone-4,4'-dicarboxylic acid.

The aromatic carboxylic acids used in accordance with the invention and having a low phosphoric acid affinity are preferably isophthalic acid, terephthalic acid, phthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, diphenyl ether 4,4'-dicarboxylic acid, benzophenone-4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid.

The diaminocarboxylic acids used in accordance with the invention and having a high phosphoric acid affinity are preferably diaminobenzoic acid and the mono and dihydrochloride derivatives thereof, and also 1,2-diamino-3'-carboxy acid 4,4'-diphenyl ether.

The aromatic tri-, tetracarboxylic acids or the C1-C20-alkyl esters or C5-C12-aryl esters thereof or the acid anhydrides thereof or the acid chlorides thereof are preferably 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; 3,5,4'-biphenyltricarboxylic acid.

The aromatic tetracarboxylic acids or the C1-C20-alkyl esters or C5-C12-aryl esters thereof or the acid anhydrides thereof or the acid chlorides thereof are preferably 3,5,3',5'-biphenyltetracarboxylic acid; benzene-1,2,4,5-tetracarboxylic acid; benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used in accordance with the invention are heteroaromatic dicarboxylic acids and tricarboxylic acids and tetracarboxylic acids or the esters thereof or the anhydrides thereof. Heteroaromatic carboxylic acids are understood to mean aromatic systems which contain at least one nitrogen, oxygen, sulfur or phosphorus atom in the aromatic. They are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also the C1-C20-alkyl esters or C5-C12-aryl esters thereof, or the acid anhydrides thereof or the acid chlorides thereof.

The content of tricarboxylic acid or tetracarboxylic acids (based on dicarboxylic acid used) is between 0 and 30 mol %, preferably 0.1 and 20 mol %, in particular 0.5 and 10 mol %.

In step A), preference is also given to using mixtures of at least 2 different aromatic carboxylic acids, the ratio of the monomers being between 1:99 and 99:1, preferably from 1:50 to 50:1. It is thus possible to use carboxylic acids having a high phosphoric acid affinity and carboxylic acids having a low phosphoric acid affinity equally, although the selection of the carboxylic acids and the mixing ratio are selected so as to result, in the subsequent polymerization (step B), in a polymer whose phosphoric acid affinity is above that of the polymer formed in step D).

In step A), preference is also given to using mixtures of at least 2 different aromatic tetraamino compounds, in which case the ratio of the monomers is between 1:99 and 99:1, preferably from 1:50 to 50:1. It is thus possible to use tetraamino compounds having a high phosphoric acid affinity and tetraamino compounds having a low phosphoric acid affinity equally, although the selection of the tetraamino compounds and the mixing ratio are selected so as to result, in the subsequent polymerization (step B), in a polymer whose phosphoric acid affinity is above that of the polymer formed in step D).

It has been found that the total content of monomers having a low phosphoric acid affinity based on all monomers used in step A) can be tolerated up to 40% by weight, preferably of up to 25% by weight, in particular from 0.1 to 25% by weight.

In step C), preference is also given to using mixtures of at least 2 different aromatic carboxylic acids, in which case the ratio of the monomers is between 1:99 and 99:1, preferably from 1:50 to 50:1. It is thus possible to use carboxylic acids having a high phosphoric acid affinity and carboxylic acids having a low phosphoric acid affinity equally, although the selection of the carboxylic acids and the mixing ratio is selected so as to result, in the subsequent polymerization (step D), in a polymer whose phosphoric acid affinity is lower than that of the polymer formed in step B).

In step C), preference is also given to using mixtures of at least 2 different aromatic tetraamino compounds, in which case the ratio of the monomers is between 1:99 and 99:1, preferably from 1:50 to 50:1. It is thus possible to use tetraamino compounds having a high phosphoric acid affinity and tetraamino compounds having a low phosphoric acid affinity equally, although the selection of the tetraamino compounds and the mixing ratio is selected so as to result, in the subsequent polymerization (step D), in a polymer whose phosphoric acid affinity is lower than that of the polymer formed in step B).

It has been found that the total content of monomers having a high phosphoric acid affinity based on all monomers used in step C) can be tolerated up to 40% by weight, preferably of up to 25% by weight, in particular from 0.1 to 25% by weight.

In step E), the polymers obtained in steps B) and D) are mixed. The mixing ratio of the polymers is between 1:99 and 99:1, preferably from 1:50 to 50:1.

The polyphosphoric acid used in step A) and C) is commercial polyphosphoric acid as obtainable, for example, from Riedel-de Haen. The polyphosphoric acids $H_{n+2}P_nO_{3n+1}$ (n>1) typically have a content, calculated as $P_2O_5$ (by acidimetry), of at least 83%. Instead of a solution of the monomers, it is also possible to obtain a dispersion/suspension.

The mixture obtained in step A) and C) has a weight ratio of polyphosphoric acid to sum of all monomers of from 1:10 000 to 10 000:1, preferably from 1:1000 to 1000:1, in particular from 1:100 to 100:1.

The polymerization in steps B) and D) is carried out at a temperature and for a time until an intrinsic viscosity of up 1.5 dl/g, preferably from 0.3 to 1.0 dl/g, in particular from 0.5 to 0.8 dl/g. Typically, the temperatures are up to 200° C., preferably up to 180° C., in particular from 100° C. to 180° C. The time is typically from a few minutes (5 minutes) up to several hours (100 hours). The above reaction conditions depend upon the reactivity of the particular monomers.

The layer formation according to step F) is effected by means of measures known per se (casting, spraying, knife-coating), which are known from the prior art for polymer film production. Suitable carriers are all carriers which can be referred to as inert under the conditions. To adjust the viscosity, the solution can optionally be admixed with phosphoric acid (conc. phosphoric acid, 85%). This allows the viscosity to be adjusted to the desired value and the formation of the membrane to be facilitated.

The layer obtained according to step F) has a thickness between 20 and 4000 µm, preferably between 30 and 3500 µm, in particular between 50 and 3000 µm.

The polymerization of the polyazole block polymer in step G) is carried out at a temperature and for a time until the intrinsic viscosity is more than 1.5 dl/g, preferably more than 1.8 dl/g, in particular more than 1.9 dl/g. Typically, the temperatures are up to 350° C., preferably up to 280° C. The time is typically from a few minutes (min. 1 minute) up to several hours (10 hours). The above reaction conditions depend upon the reactivity of the particular polymers, and also upon the layer thickness.

The polyazole-based block polymer formed in step G) contains repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

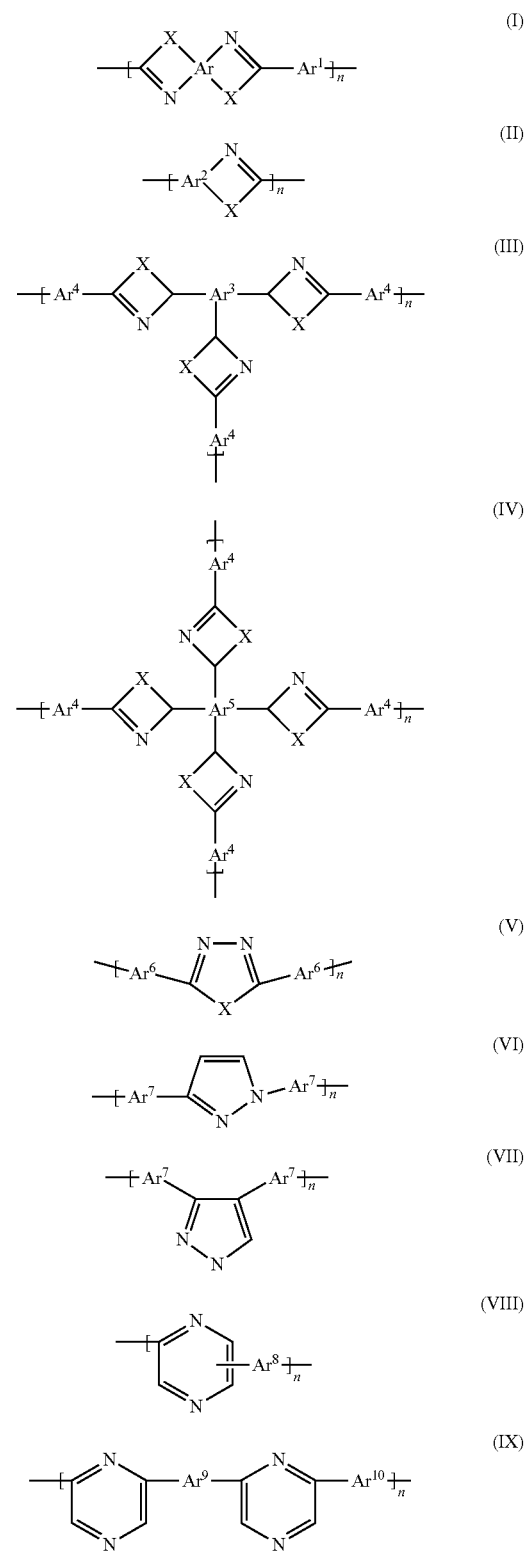

-continued

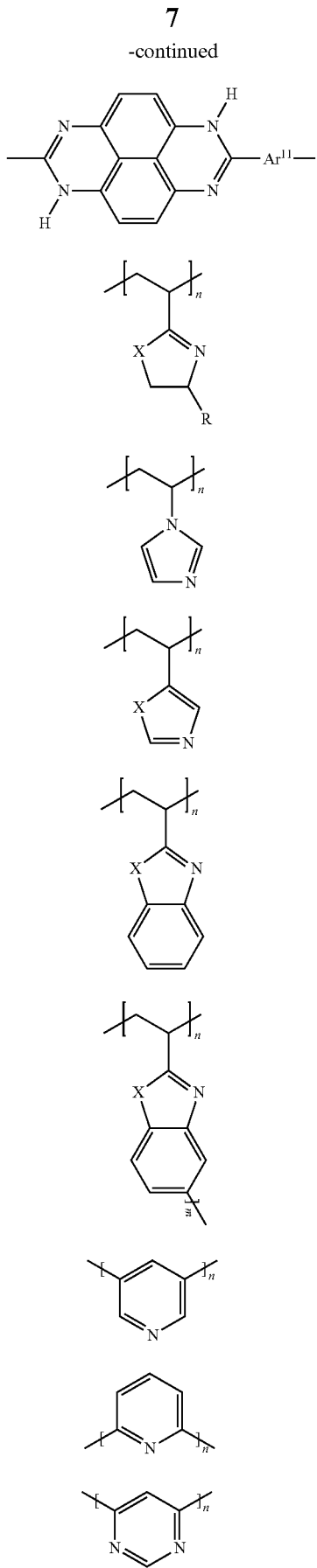

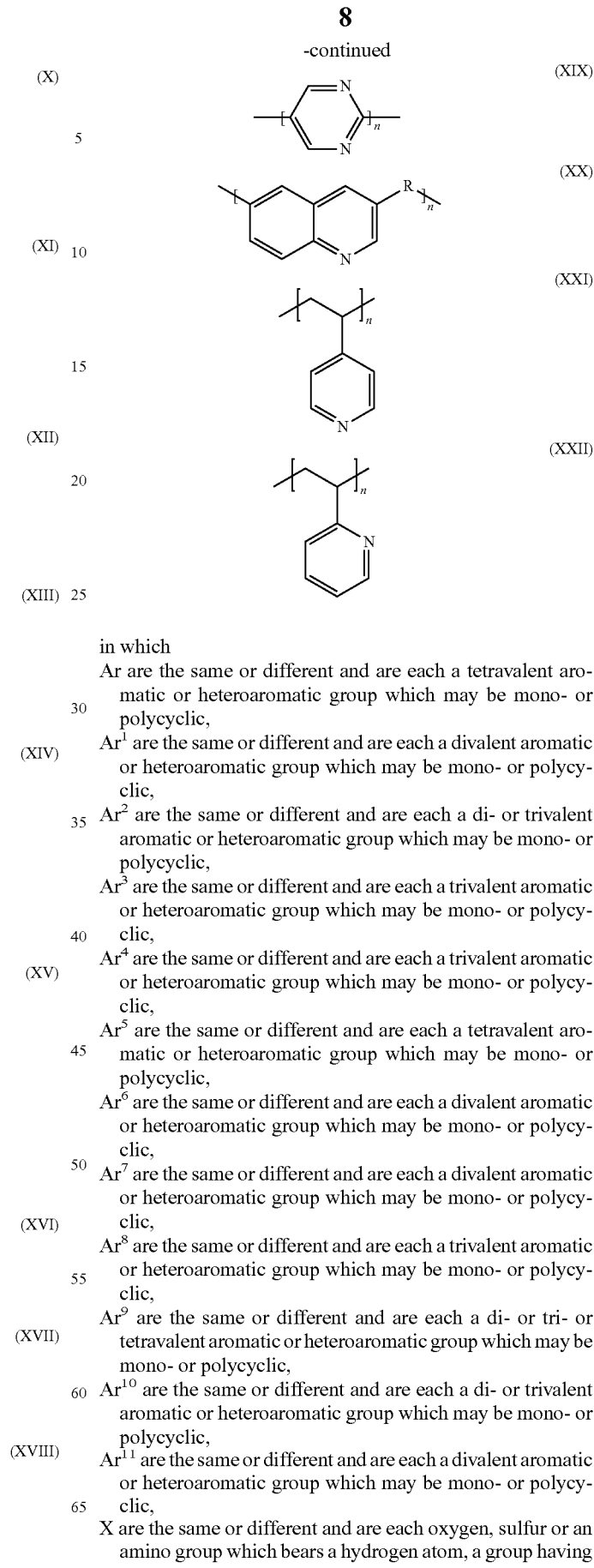

in which
Ar are the same or different and are each a tetravalent aromatic or heteroaromatic group which may be mono- or polycyclic,
$Ar^1$ are the same or different and are each a divalent aromatic or heteroaromatic group which may be mono- or polycyclic,
$Ar^2$ are the same or different and are each a di- or trivalent aromatic or heteroaromatic group which may be mono- or polycyclic,
$Ar^3$ are the same or different and are each a trivalent aromatic or heteroaromatic group which may be mono- or polycyclic,
$Ar^4$ are the same or different and are each a trivalent aromatic or heteroaromatic group which may be mono- or polycyclic,
$Ar^5$ are the same or different and are each a tetravalent aromatic or heteroaromatic group which may be mono- or polycyclic,
$Ar^6$ are the same or different and are each a divalent aromatic or heteroaromatic group which may be mono- or polycyclic,
$Ar^7$ are the same or different and are each a divalent aromatic or heteroaromatic group which may be mono- or polycyclic,
$Ar^8$ are the same or different and are each a trivalent aromatic or heteroaromatic group which may be mono- or polycyclic,
$Ar^9$ are the same or different and are each a di- or tri- or tetravalent aromatic or heteroaromatic group which may be mono- or polycyclic,
$Ar^{10}$ are the same or different and are each a di- or trivalent aromatic or heteroaromatic group which may be mono- or polycyclic,
$Ar^{11}$ are the same or different and are each a divalent aromatic or heteroaromatic group which may be mono- or polycyclic,
X are the same or different and are each oxygen, sulfur or an amino group which bears a hydrogen atom, a group having 1-20 carbon atoms, preferably a branched or unbranched alkyl or alkoxy group, or an aryl group as further radical, R is the same or different and is hydrogen, an alkyl group or an aromatic group, with the proviso that R in formula (XX) is not hydrogen, and n, m are each an integer greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of $Ar^1$, $Ar^4$, $Ar^6$, $Ar^7$, $Ar^8$, $Ar^9$, $Ar^{10}$, $Ar^{11}$ is as desired; in the case of phenylene, for example, $Ar^1$, $Ar^4$, $Ar^6$, $Ar^7$, $Ar^8$, $Ar^9$, $Ar^{10}$, $Ar^{11}$ may be ortho-, meta- and para-phenylene. Particularly preferred groups derive from benzene and biphenylene, which may optionally also be substituted.

Preferred alkyl groups are short-chain alkyl groups having from 1 to 4 carbon atoms, for example methyl, ethyl, n- or i-propyl and t-butyl groups.

Preferred aromatic groups are phenyl or naphthyl groups. The alkyl groups and the aromatic groups may be substituted.

Preferred substituents are halogen atoms, for example fluorine, amino groups, hydroxy groups or short-chain alkyl groups, for example methyl or ethyl groups.

Preference is given to polyazoles having repeat units of the formula (I) in which the X radicals are the same within one repeat unit.

The polyazoles may in principle also have different repeat units which differ, for example, in their X radical. However, it preferably has only identical X radicals in a repeat unit.

Further preferred polyazole polymers are polyimidazoles, polybenzothiazoles, polybenzooxazoles, polyoxadiazoles, polyquinoxalines, polythiadiazoles, poly(pyridines), poly(pyrimidines) and poly(tetraazapyrenes).

In a further embodiment of the present invention, the polymer containing repeat azole units is a copolymer or a blend which contains at least two units of the formula (I) to (XXII) which differ from one another.

The number of repeat azole units in the polymer is preferably an integer greater than or equal to 10. Particularly preferred polymers contain at least 100 repeat azole units.

In the context of the present invention, preference is given to block polymers containing repeat benzimidazole units. Some examples of the highly appropriate polymers containing repeat benzimidazole units are represented by the following formulae:

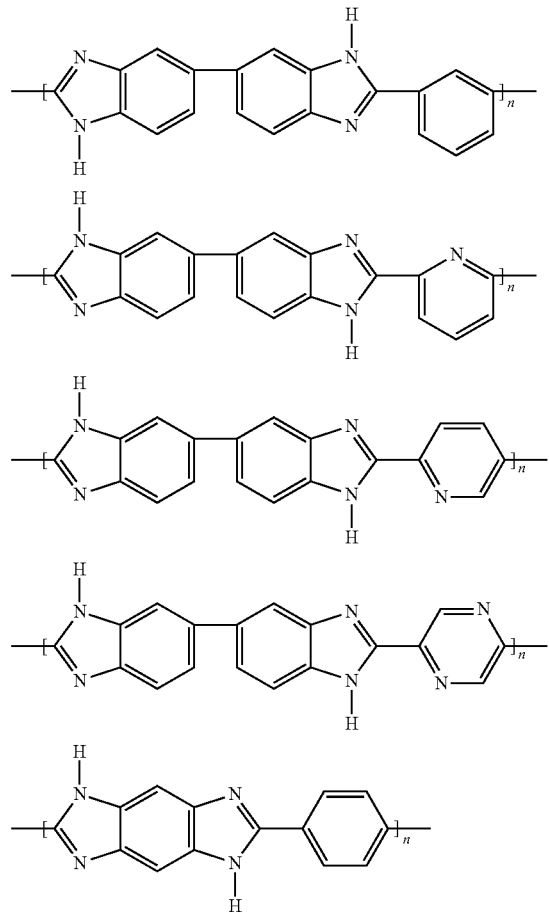
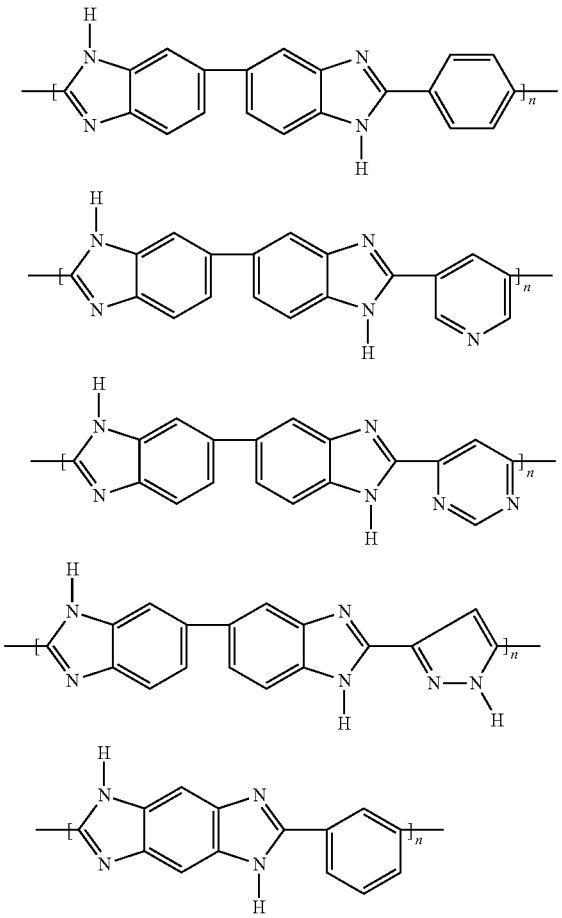

-continued

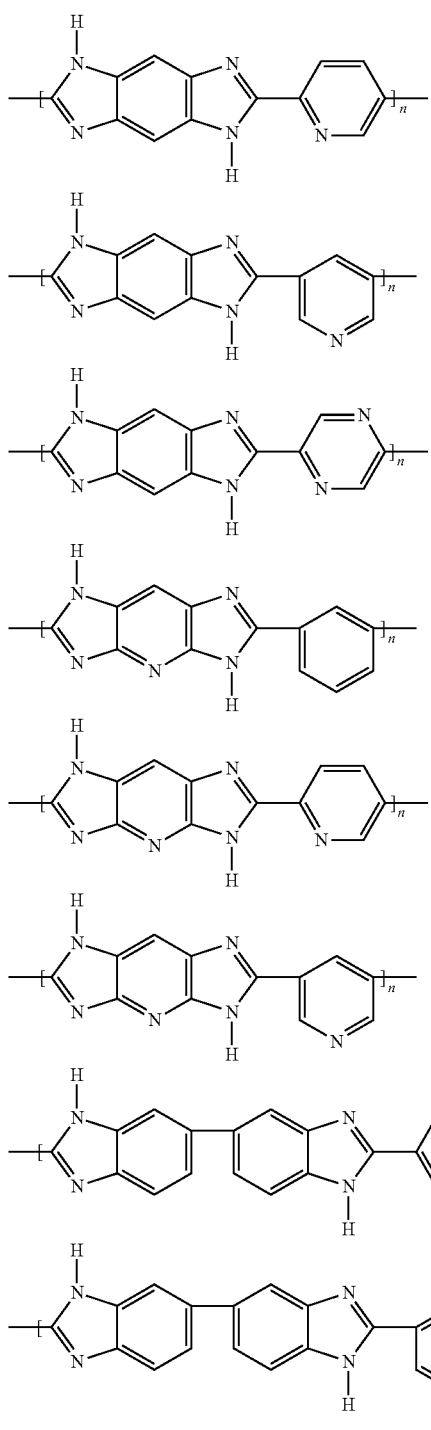
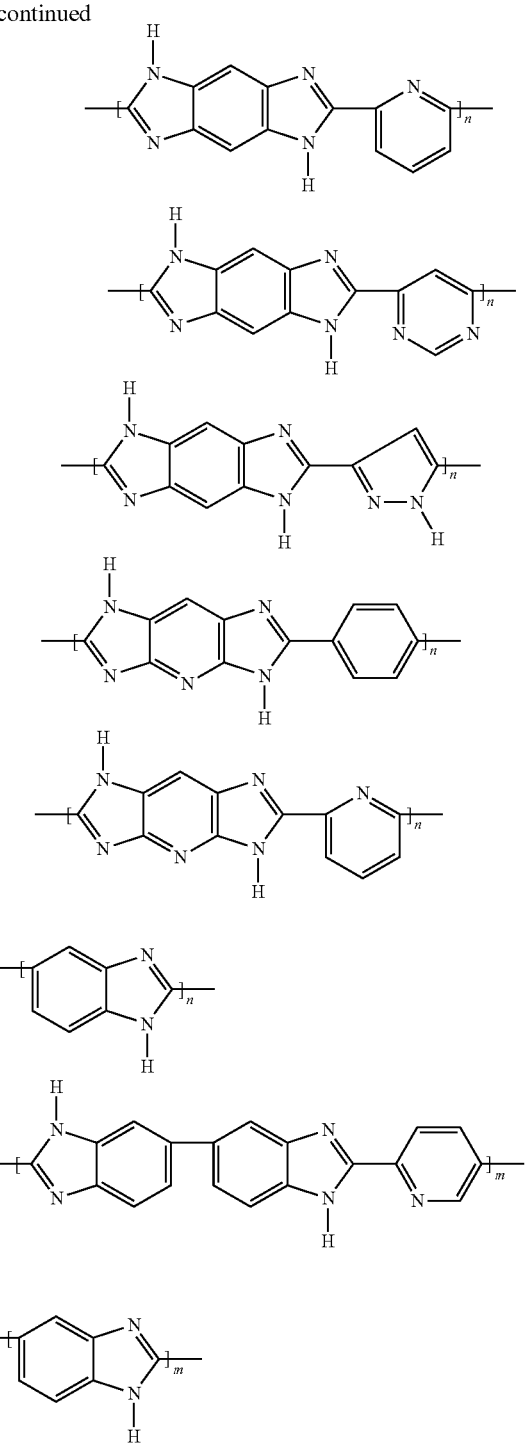

where n and m are each an integer greater than or equal to 10, preferably greater than or equal to 100.

When the mixture according to step A) and C) also comprises tricarboxylic acids or tetracarboxylic acid, this achieves branching/crosslinking of the polymer formed. This contributes to improving the mechanical properties.

The layer obtained according to step F) is treated in the presence of moisture at temperatures and for a time sufficient for the layer to have sufficient strength for use in fuel cells. The treatment can be effected to the extent that the membrane is self-supporting, so that it can be removed from the carrier without damage.

In one variant of the process, heating the mixture from step E) to temperatures of up to 350° C., preferably up to 280° C., already brings about the formation of the block polymer. This can be done via the measurement of the intrinsic viscosity. As soon as this has attained the values required in step G), it is possible to entirely or partly dispense with the thin-layer polymerization in step G). The time for the variant is typically from a few minutes (20 minutes) up to several hours (40 hours). The above reaction conditions depend upon the reactivity of the particular monomers. This variant too forms part of the subject matter of the present invention.

The membrane is treated in step H) at temperatures above 0° C. and less than 150° C., preferably at temperatures between 10° C. and 120° C., in particular between room temperature (20° C.) and 90° C., in the presence of moisture or water and/or steam and/or aqueous phosphoric acid of up to 85%. The treatment is effected preferably under standard pressure, but may also be effected under the action of pressure. It is important that the treatment is done in the presence of sufficient moisture, as a result of which the polyphosphoric acid present contributes to the strengthening of the membrane by virtue of partial hydrolysis to form low molecular weight polyphosphoric acid and/or phosphoric acid.

The partial hydrolysis of the polyphosphoric acid in step H) leads to strengthening of the membrane and to a decrease in the layer thickness and formation of a membrane having a thickness between 15 and 3000 μm, preferably between 20 and 2000 μm, in particular between 20 and 1500 μm, which is self-supporting. The intra- and intermolecular structures present in the polyphosphoric acid layer (interpenetrating networks, IPN) lead to ordered membrane formation which draws responsible for the particular properties of the membranes formed.

The upper temperature limit of the treatment according to step H) is generally 150° C. In the case of extremely brief action of moisture, for example of superheated steam, this steam may also be hotter than 150° C. The essential condition for the upper temperature limit is the duration of treatment.

The partial hydrolysis (step H) can also be effected in climate-controlled chambers in which the hydrolysis can be controlled under defined action of moisture. In this case, the moisture can be adjusted in a controlled manner by the temperature or saturation of the contacting environment, for example gases such as air, nitrogen, carbon dioxide or other suitable gases, or steam. The treatment time is dependent upon the parameters selected above.

The treatment time is also dependent upon the thickness of the membrane.

In general, the treatment time is between a few seconds to minutes, for example under reaction of superheated steam, or up to whole days, for example under air at room temperature and low relative atmospheric moisture. The treatment time is preferably between 10 seconds and 300 hours, in particular from 1 minute to 200 hours.

When the partial hydrolysis is carried out at room temperature (20° C.) with ambient air of relative atmospheric moisture content of 40-80%, the treatment time is between 1 and 200 hours.

The membrane obtained according to step H) may be in self-supporting form, i.e. it can be removed from the carrier without damage and subsequently optionally be further processed directly.

It is possible via the degree of hydrolysis, i.e. the time, temperature and atmospheric moisture content, to adjust the concentration of phosphoric acid and hence the conductivity of the inventive polymer membrane. According to the invention, the concentration of phosphoric acid is reported as mole of acid per mole of repeat unit of the polymer. In the context of the present invention, preference is given to a concentration (mole of phosphoric acid based on a repeat unit of the formula (III), i.e. polybenzimidazole) of at least 20, preferably of at least 30, in particular of at least 51. Such high degrees of doping (concentrations) are obtainable with great difficulty, if at all, by doping polyazoles with commercially available ortho-phosphoric acid. The polyazole membranes described in the German patent application No. 10117687.2 too exhibit a high phosphoric acid content. However, the inventive block polymer membranes surpass these considerably and additionally exhibit very good elongation at break. It is thus possible to increase the phosphoric acid content and simultaneously to obtain improved mechanical properties. Thus, the inventive block polymers exhibit an elongation of at least 400%, preferably of at least 500% (at from 1.2 to 1.8 MPa). At smaller forces of from 0.6 to 0.8 MPa, the elongations at break are more than 550%, in some cases even more than 1000%.

After the treatment according to step H), the membrane can also be crosslinked on the surface by reaction of heat in the presence of atmospheric oxygen. This curing of the membrane surface improves the properties of the membrane additionally. The crosslinking can also be effected by the action of IR or NIR (IR=infrared, i.e. light having a wavelength of more than 700 nm; NIR=near IR, i.e. light having a wavelength in the range from approx. 700 to 2000 nm or an energy in the range from approx. 0.6 to 1.75 eV). A further method is irradiation with β-rays. The radiation dose here is between 5 and 200 kGy.

The inventive block polymer membrane has improved material properties compared to the doped polymer membranes known to date. In particular, they exhibit better performance in comparison with known doped polymer membranes. The reason for this is in particular improved proton conductivity. At temperatures of 160° C., this is at least 0.13 S/cm, preferably at least 0.14 S/cm, in particular at least 0.15 S/cm.

To further improve the performance properties, it is additionally possible to add fillers, especially proton-conducting fillers, and also additional acids to the membrane. The addition may be effected either in step A and/or C or after the polymerization (step B and/or D or E)

Nonlimiting examples of proton-conducting fillers are

Sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, Phosphates such as $Zr_3(PO_4)_4$, $Zr(HPO_4)_2$, $HZr_2(PO_4)_3$, $UO_2PO_4.3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, Polyacid such as $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ Selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, Oxides such as $Al_2O_3$, $Sb_2O_5$, $ThO_2$, $SnO_2$, $ZrO_2$, $MoO_3$ Silicates such as zeolites, zeolites($NH_4+$), sheet silicates, framework silicates, H-natrolites, H-mordenites, $NH_4$-analcines, $NH_4$-sodalites, $NH_4$-gallates, H-montmorillonites Acids such as $HClO_4$, $SbF_5$ Fillers such as carbides, in particular SiC, $Si_3N_4$, fibers, in particular glass fibers, glass powders and/or polymer powders, preferably based on polyazoles.

In addition, this membrane may also contain perfluorinated sulfonic acid additives (0.1-20% by weight, preferably 0.2-15% by weight, very preferably 0.2-10% by weight). These additives lead to enhancement of performance, to an increase in the oxygen solubility and oxygen diffusion close to the cathode and to a reduction in the adsorption of phosphoric acid and phosphate on platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of persulfonated additives are:
trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutane sulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

In addition, the membrane may also comprise as additives which scavenge (primary antioxidants) or destroy (secondary antioxidants) the peroxide radicals generated in oxygen reduction in the course of operation and thus, as described in JP2001118591 A2, improve lifetime and stability of the membrane and membrane-electrode unit. The way in which such additives function and their molecular structures are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998.

Nonlimiting examples of such additives are:
bis(trifluoromethyl)nitroxide, 2,2-diphenyl-1-picrinylhydrazyl, phenols, alkylphenols, sterically hindered alkylphenols, for example Irganox, aromatic amines, sterically hindered amines, for example Chimassorb; sterically hindered hydroxylamines, sterically hindered alkylamines, sterically hindered hydroxylamines, sterically hindered hydroxylamine ethers, phosphites, for example Irgafos, nitrosobenzene, methyl-2-nitrosopropane, benzophenone, benzaldehyde tert-butyl nitron, cysteamine, melanines, lead oxides, manganese oxides, nickel oxides, cobalt oxides.

Possible fields of use of the inventive doped polymer membranes include use in fuel cells, in electrolysis, in capacitors and in battery systems. Owing to their property profile, the doped polymer membranes are preferably used in fuel cells.

The present invention also relates to a membrane-electrode unit which has at least one inventive polymer membrane. For further information about membrane-electrode units, reference is made to the technical literature, especially to the patents U.S. Pat. No. 4,191,618, U.S. Pat. No. 4,212,714 and U.S. Pat. No. 4,333,805. The disclosure present in the aforementioned references [U.S. Pat. No. 4,191,618, U.S. Pat. No. 4,212,714 and U.S. Pat. No. 4,333,805] with regard to the construction and the production of membrane-electrode units, and also the electrodes, gas diffusion layers and catalysts to be selected, also forms part of the description.

In one variant of the present invention, the membrane can also form directly on the electrode instead of on a carrier. This allows the treatment according to step H) to be shortened appropriately, since the membrane no longer has to be self-supporting. Such a membrane also forms part of the subject matter of the present invention.

The present invention further provides an electrode which having a proton-conducting polymer coating based on polyazoles, obtainable by a process comprising the steps of A) mixing one or more aromatic tetraamino compounds having a high phosphoric acid affinity or low phosphoric acid affinity
  with one or more aromatic carboxylic acids or esters thereof which contain at least two acid groups per carboxylic acid monomer which have a high phosphoric acid affinity or low phosphoric acid affinity,
  or mixing one or more aromatic and/or heteroaromatic diaminocarboxylic acids having a high phosphoric acid affinity in polyphosphoric acid to form a solution and/or dispersion
B) heating the mixture from step A), preferably under inert gas, and polymerizing until an intrinsic viscosity of up to 1.5 dl/g, preferably from 0.3 to 1.0 dl/g, in particular from 0.5 to 0.8 dl/g, is obtained to form a polymer whose phosphoric acid affinity is greater than the phosphoric acid affinity of the polymer formed in step D),
C) mixing one or more aromatic tetraamino compounds having a high phosphoric acid affinity or low phosphoric acid affinity
  with one or more aromatic carboxylic acids or esters thereof which contain at least two acid groups per carboxylic acid monomer which have a high phosphoric acid affinity or low phosphoric acid affinity, in polyphosphoric acid to form a solution and/or dispersion
D) heating the mixture from step C), preferably under inert gas, and polymerizing until an intrinsic viscosity of up to 1.5 dl/g, preferably from 0.3 to 1.0 dl/g, in particular from 0.5 to 0.8 dl/g, is obtained to form a polymer whose phosphoric acid affinity is less than the phosphoric acid affinity of the polymer formed in step B),
E) combining the polymer from step B) and the polymer from step D), the phosphoric acid affinity of the polymer from step B) being greater than the phosphoric acid affinity of the polymer from step D),
F) applying a layer using the mixture according to step E) on an electrode,
G) heating the sheetlike structure/layer obtainable according to step F), preferably under inert gas, until an intrinsic viscosity of more than 1.5 dl/g, preferably of more than 1.8 dl/g, in particular of more than 2.0 dl/g, is attained to form a polyazole block polymer,
H) treating the membrane formed in step G).

The variants and preferred embodiments described above are also valid for this subject matter, so that there is no need to repeat them at this point.

After step H), the coating has a thickness between 2 and 3000 μm, preferably between 3 and 2000 μm, in particular between 5 and 1500 μm.

An electrode coated in this way can be installed in a membrane-electrode unit which optionally has at least one inventive block polymer membrane.

General Test Methods:
Test Method for IEC

The conductivity of the membrane depends greatly upon the content of acid groups expressed by the so-called ion exchange capacity (IEC). To measure the ion exchange capacity, a sample with a diameter of 3 cm is stamped out and introduced into a beaker filled with 100 ml of water. The released acid is titrated with 0.1 M NaOH. Subsequently, the sample is withdrawn, excess water is dabbed off and the sample is dried at 160° C. over 4 h. The dry weight, $m_0$, is then determined gravimetrically with a precision of 0.1 mg. The ion exchange capacity is then calculated from the consumption of 0.1M NaOH up to the first titration end point, $V_1$ in ml, and the dry weight, $m_0$ in mg, by the following formula:

$$IEC = V_1 * 300/m_0$$

Test Method for Specific Conductivity

The specific conductivity is measured by means of impedance spectroscopy in a 4-pole arrangement in potentiostatic mode and using platinum electrodes (wire, diameter 0.25 mm). The distance between the current-collecting electrodes is 2 cm. The resulting spectrum is evaluated with a simple model consisting of a parallel arrangement of an ohmic resistance and a capacitor. The sample cross section of the phosphoric acid-doped membrane is measured immediately before the sample mounting, To measure the temperature dependence, the test cell is brought to the desired temperature in an oven and controlled by means of a Pt-100 thermoelement io positioned in the immediate vicinity of the sample. On attainment of the temperature, the sample is kept at this temperature for 10 minutes before the start of the measurement.

What is claimed is:

1. An electrode having a proton-conducting polymer coating based on polyazoles, obtained by a process comprising the steps of:
   A) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity,
   or mixing one or more aromatic and/or heteroaromatic diaminocarboxylic acids having a high phosphoric acid affinity, in polyphosphoric acid to form a solution and/or dispersion;
   B) heating the mixture from step A), and polymerizing until an intrinsic viscosity of up to 1.5 dl/g, is obtained to form a polymer whose phosphoric acid affinity is greater than the phosphoric acid affinity of the polymer formed in step D);
   C) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity, in polyphosphoric acid to form a solution and/or dispersion;
   D) heating the mixture from step C), and polymerizing until an intrinsic viscosity of up to 1.5 dl/g, is obtained to form a polymer whose phosphoric acid affinity is less than the phosphoric acid affinity of the polymer formed in step B);
   E) combining the polymer from step B) and the polymer from step D), the phosphoric acid affinity of the polymer from step B) being greater than the phosphoric acid affinity of the polymer from step D);
   F) forming a layer by applying the mixture obtained in step E) on an electrode;
   G) heating the layer obtained according to step F), until an intrinsic viscosity of more than 1.5 dl/g, is attained to form a polyazole block copolymer membrane; and
   H) partially hydrolyzing the polyphosphoric acid in the membrane formed in step G), thereby forming the electrode.

2. The electrode as claimed in claim 1, wherein the coating having a thickness between 2 μm and 3000 μm.

3. The electrode as claimed in claim 1, wherein the coating having a thickness between 3 μm and 2000 μm.

4. The electrode as claimed in claim 1, wherein the coating having a thickness between 5 μm and 1500 μm.

5. The electrode as claimed in claim 1, obtained by a process comprising the steps of:
   A) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity,
   or mixing one or more aromatic and/or heteroaromatic diaminocarboxylic acids having a high phosphoric acid affinity, in polyphosphoric acid to form a solution and/or dispersion;
   B) heating the mixture from step A), and polymerizing until an intrinsic viscosity of 0.3 to 1.0 dl/g, is obtained to form a polymer whose phosphoric acid affinity is greater than the phosphoric acid affinity of the polymer formed in step D);
   C) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity, in polyphosphoric acid to form a solution and/or dispersion;
   D) heating the mixture from step C), and polymerizing until an intrinsic viscosity of 0.3 to 1.0 dl/g, is obtained to form a polymer whose phosphoric acid affinity is less than the phosphoric acid affinity of the polymer formed in step B);
   E) combining the polymer from step B) and the polymer from step D), the phosphoric acid affinity of the polymer from step B) being greater than the phosphoric acid affinity of the polymer from step D);
   F) forming a layer by applying the mixture obtained in step E) on an electrode;
   G) heating the layer obtained according to step F), under inert gas, until an intrinsic viscosity of more than 1.8 dl/g, is attained to form a polyazole block copolymer membrane; and
   H) partially hydrolyzing the polyphosphoric acid in the membrane formed in step G), thereby forming the electrode.

6. The electrode as claimed in claim 1, obtained by a process comprising the steps of:
   A) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity,
   or mixing one or more aromatic and/or heteroaromatic diaminocarboxylic acids having a high phosphoric acid affinity, in polyphosphoric acid to form a solution and/or dispersion;
   B) heating the mixture from step A), and polymerizing until an intrinsic viscosity of 0.5 to 0.8 dl/g, is obtained to form a polymer whose phosphoric acid affinity is greater than the phosphoric acid affinity of the polymer formed in step D);
   C) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity, in polyphosphoric acid to form a solution and/or dispersion;

D) heating the mixture from step C), and polymerizing until an intrinsic viscosity of 0.5 to 0.8 dl/g, is obtained to form a polymer whose phosphoric acid affinity is less than the phosphoric acid affinity of the polymer formed in step B);

E) combining the polymer from step B) and the polymer from step D), the phosphoric acid affinity of the polymer from step B) being greater than the phosphoric acid affinity of the polymer from step D);

F) forming a layer by applying the mixture obtained in step E) on an electrode;

G) heating the layer obtained according to step F), under inert gas, until an intrinsic viscosity of more than 2.0 dl/g, is attained to form a polyazole block copolymer membrane; and H) partially hydrolyzing the polyphosphoric acid in the membrane formed in step G), thereby forming the electrode.

7. A membrane-electrode unit comprising at least one electrode as claimed in claim 1 and at least one membrane.

8. A membrane-electrode unit comprising at least one electrode as claimed in claim 1 and at least one membrane based on polyazoles, obtained by a process comprising the steps of:
A) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity,
or mixing one or more aromatic and/or heteroaromatic diaminocarboxylic acids having a high phosphoric acid affinity, in polyphosphoric acid to form a solution and/or dispersion, B) heating the mixture from step A), and polymerizing until an intrinsic viscosity of up to 1.5 dl/g, is obtained to form a polymer whose phosphoric acid affinity is greater than the phosphoric acid affinity of the polymer formed in step D);
C) mixing one or more aromatic tetraamino compounds having a high phosphoric acid affinity or low phosphoric acid affinity with one or more aromatic carboxylic acids or esters thereof which contain at least two acid groups per carboxylic acid monomer which have a high phosphoric acid affinity or low phosphoric acid affinity, in polyphosphoric acid to form a solution and/or dispersion;
D) heating the mixture from step C), and polymerizing until an intrinsic viscosity of up to 1.5 dl/g, is obtained to form a polymer whose phosphoric acid affinity is less than the phosphoric acid affinity of the polymer formed in step B);
E) combining the polymer from step B) and the polymer from step D), the phosphoric acid affinity of the polymer from step B) being greater than the phosphoric acid affinity of the polymer from step D);
F) forming a layer by applying the mixture obtained in step E) on a carrier or on an electrode;
G) heating the layer obtained according to step F), until an intrinsic viscosity of more than 1.5 dl/g, is attained to form a polyazole block copolymer membrane; and
H) partially hydrolyzing the polyphosphoric acid in the membrane formed in step G) until it is self-supporting, forming thereby the membrane-electrode unit.

9. A fuel cell comprising one or more membrane-electrode units as claimed in claim 7.

10. A fuel cell comprising one or more membrane-electrode units as claimed in claim 8.

11. A membrane-electrode unit comprising at least one electrode as claimed in claim 1 and at least one membrane based on polyazoles, obtained by a process comprising the steps of:
A) mixing one or more aromatic tetraamino compounds having a high phosphoric acid affinity or low phosphoric acid affinity
with one or more aromatic carboxylic acids or esters thereof which contain at least two acid groups per carboxylic acid monomer which have a high phosphoric acid affinity or low phosphoric acid affinity,
or mixing one or more aromatic and/or heteroaromatic diaminocarboxylic acids having a high phosphoric acid affinity, in polyphosphoric acid to form a solution and/or dispersion;
B) heating the mixture from step A) and polymerizing until an intrinsic viscosity of up to 1,5 dl/g is obtained to form a polymer whose phosphoric acid affinity is greater than the phosphoric acid affinity of the polymer formed in step D);
C) mixing one or more aromatic tetraamino compounds having a high phosphoric acid affinity or low phosphoric acid affinity
with one or more aromatic carboxylic acids or esters thereof which contain at least two acid groups per carboxylic acid monomer which have a high phosphoric acid affinity or low phosphoric acid affinity, in polyphosphoric acid to form a solution and/or dispersion;
D) heating the mixture from step C) and polymerizing until an intrinsic viscosity of up to 1,5 dl/g is obtained to form a polymer whose phosphoric acid affinity is less than the phosphoric acid affinity of the polymer formed in step B);
E) combining the polymer from step B) and the polymer from step D), the phosphoric acid affinity of the polymer from step B) being greater than the phosphoric acid affinity of the polymer from step D);
F) heating the mixture obtained according to step E) to temperature of up to 350° C., until an intrinsic viscosity of more than 1.5 dl/g is attained to form a polyazole block copolymer membrane;
G) forming a layer by applying the polazole block copolymer according to step F) on a carrier or on an electrode; and
H) partially hydrolyzing the polyphosphoric acid in the membrane formed in step F) until it is self-supporting, thereby forming the proton-conducting polymer membrane.

12. A membrane-electrode unit comprising at least one electrode as claimed in claim 1 and at least one membrane based on polyazoles, obtained by a process comprising the steps of:
A) mixing one or more aromatic tetraamino compounds having a high phosphoric acid affinity or low phosphoric acid affinity
with one or more aromatic carboxylic acids or esters thereof which contain at least two acid groups per carboxylic acid monomer which have a high phosphoric acid affinity or low phosphoric acid affinity,
or mixing one or more aromatic and/or heteroaromatic diaminocarboxylic acids having a high phosphoric acid affinity, in polyphosphoric acid to form a solution and/or dispersion, wherein a total content of monomers having the low phosphoric acid affinity based on all monomers used in step A) is up to 40% by weight;

B) heating the mixture from step A), under inert gas, and polymerizing until an intrinsic viscosity of up to 1.5 dl/g is obtained to form a polymer whose phosphoric acid affinity is greater than the phosphoric acid affinity of the polymer formed in step D);

C) mixing one or more aromatic tetraamino compounds having a high phosphoric acid affinity or low phosphoric acid affinity
with one or more aromatic carboxylic acids or esters thereof which contain at least two acid groups per carboxylic acid monomer which have a high phosphoric acid affinity or low phosphoric acid affinity, in polyphosphoric acid to form a solution and/or dispersion;

D) heating the mixture from step C), under inert gas, and polymerizing until an intrinsic viscosity of up to 1.5 dl/g is obtained to form a polymer whose phosphoric acid affinity is less than the phosphoric acid affinity of the polymer formed in step B);

E) combining the polymer from step B) and the polymer from step D), the phosphoric acid affinity of the polymer from step B) being greater than the phosphoric acid affinity of the polymer from step D);

F) forming a layer by applying the mixture obtained in step E) on a carrier or on an electrode;

G) heating the layer obtained according to step F), until an intrinsic viscosity of more than 1.5 dl/g is attained to form a polyazole block copolymer membrane; and H) partially hydrolyzing the polyphosphoric acid in the membrane formed in step G) until it is self-supporting, thereby forming the proton-conducting polymer membrane.

* * * * *